United States Patent
Colombo et al.

(10) Patent No.: US 9,416,570 B1
(45) Date of Patent: Aug. 16, 2016

(54) GAS STRUT ROD SYSTEM

(71) Applicant: GM GLOBAL TECHNOLOGY OPERATIONS LLC, Detroit, MI (US)

(72) Inventors: Joel Colombo, Howell, MI (US); Michael P. Balogh, Novi, MI (US); Graham S. Foulkes, Washington Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/680,694

(22) Filed: Apr. 7, 2015

(51) Int. Cl.
*F16F 9/52* (2006.01)
*E05C 17/30* (2006.01)
*F16F 13/00* (2006.01)
*B60J 5/10* (2006.01)

(52) U.S. Cl.
CPC . *E05C 17/30* (2013.01); *B60J 5/10* (2013.01); *F16F 13/002* (2013.01)

(58) Field of Classification Search
CPC ............ F16F 9/06; F16F 9/52; F16F 9/0209; F16F 9/003; F16F 9/3405; F16F 9/526; F16F 9/0227
USPC .......................................... 188/277; 267/120
See application file for complete search history.

(56) References Cited

U.S. PATENT DOCUMENTS

| | | | | |
|---|---|---|---|---|
| 3,328,018 A * | 6/1967 | Austgen | ..................... | F16F 9/06 267/115 |
| 3,794,309 A * | 2/1974 | Chrokey | ............... | F16F 9/3405 188/322.22 |
| 3,937,450 A * | 2/1976 | Bauer | .................... | F16F 9/0227 267/113 |
| 4,408,751 A * | 10/1983 | Dodson | ...................... | F16F 9/52 188/277 |
| 4,708,696 A * | 11/1987 | Kimura | .................. | F16H 7/1236 474/103 |
| 4,854,554 A * | 8/1989 | Ludwig | ................. | E05F 1/1292 16/66 |
| 5,074,389 A * | 12/1991 | Slocum | ..................... | F16F 5/00 188/277 |
| 5,106,065 A * | 4/1992 | Staton | .................... | F16F 9/0209 188/269 |
| 5,722,643 A * | 3/1998 | Chamberlin | .............. | F16F 9/02 188/277 |
| 8,485,326 B2 * | 7/2013 | Miyasato | ................ | F16F 9/003 188/284 |
| 2004/0134729 A1* | 7/2004 | Rose | ........................ | F16F 9/526 188/277 |

* cited by examiner

*Primary Examiner* — Christopher Schwartz
(74) *Attorney, Agent, or Firm* — Cantor Colburn LLP

(57) ABSTRACT

A spring strut assembly comprises a cylinder having a wall defining an interior volume comprising a working end and a boosting chamber; the working end including a first volume and the boosting chamber including a second volume of gas. A piston assembly is disposed for reciprocation in the working end of the interior volume. A piston rod has a proximal end secured to the piston and a distal end projecting out of a first end of the cylinder. A temperature control valve assembly is disposed in the interior volume separating the working end from the boosting chamber and a shock absorbing assembly is disposed in the interior volume between the piston assembly and the first end of the cylinder, and is compressible by the piston assembly when the temperature control valve is dislodged by pressure in the boosting chamber thereby driving the piston assembly into the shock absorbing member.

15 Claims, 3 Drawing Sheets

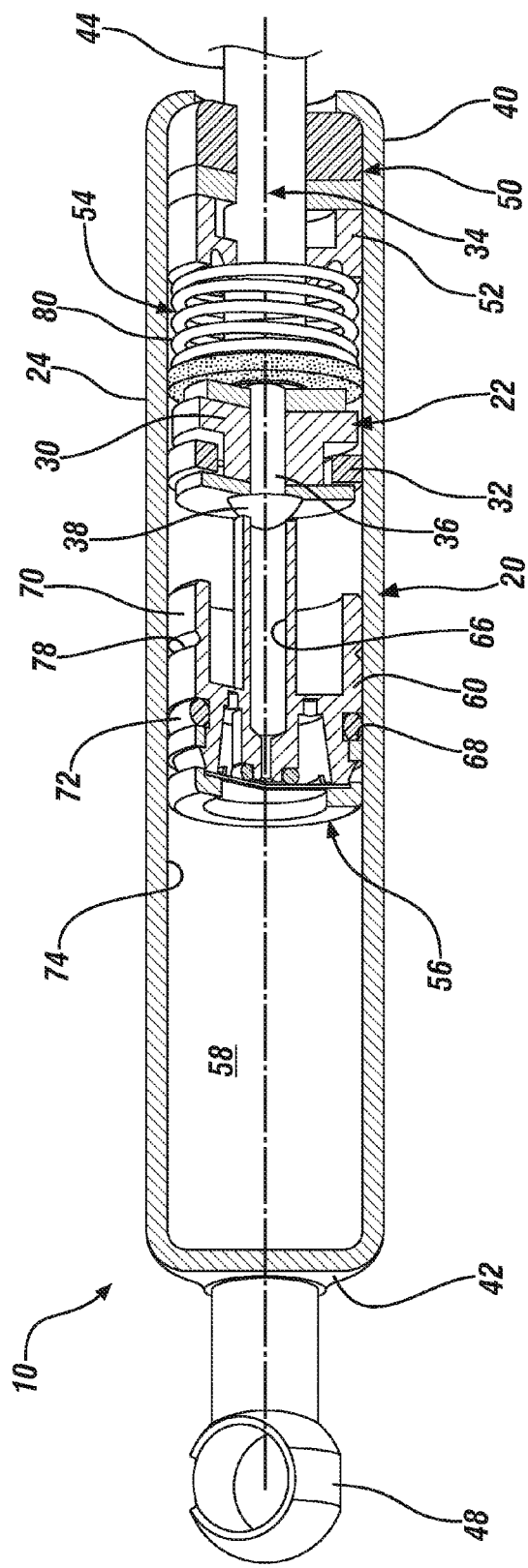
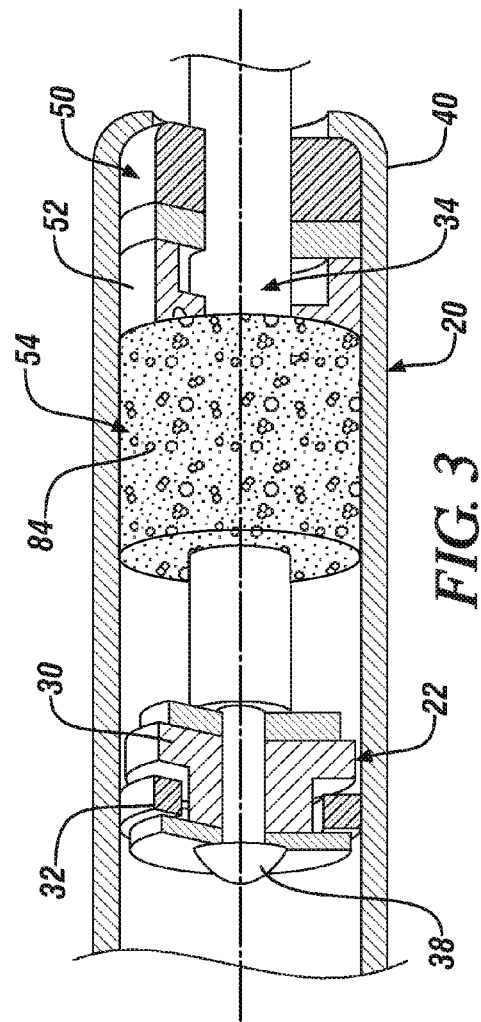
FIG. 2
FIG. 3

GAS STRUT ROD SYSTEM

FIELD OF THE INVENTION

The subject of the invention is related to multi-chamber, temperature compensated pneumatic lift struts and, more particularly, to a temperature compensated pneumatic lift strut having over-temperature protection.

BACKGROUND

Pneumatic lift struts (gas springs) are widely used to either partly or totally counterbalance engine compartment hoods, trunk lids, rear windows and tailgates of vehicles to facilitate opening them and to hold them open. The force outputs of gas springs may vary considerably with changes in ambient temperature. That is, at low ambient temperatures a gas spring produces a force that can be significantly lower than the force produced at higher ambient temperatures. To offset this effect a temperature compensating valve (TCV) assembly is assembled into pneumatic lift strut bodies. The TCV assembly separates the gas chamber of the gas spring into two separate pressure chambers. When the valve is closed (for example at temperatures above 4 degrees C.) the gas spring functions using a main pressure chamber acting on a piston and rod assembly. At lower ambient temperatures (for example at temperatures below 4 degrees C.) the valve opens, allowing the gas spring to operate and provide an output, or lift force on the piston and rod assembly, based on the volume of gas in the main pressure chamber and an additional volume. The additional volume is contained in a secondary pressure chamber.

In some cases, such as following damage to the vehicle following a crash, gas in the main pressure chamber may escape from the pneumatic lift strut due to leakage at a lift rod seal. In cases in which the pneumatic lift strut temperatures are elevated the gas pressure in the secondary pressure chamber may overcome the retention forces holding the TCV assembly in place in the pneumatic lift strut body causing it to dislodge from its seated position. The movement of the TCV assembly may be rapidly arrested at an end of the pneumatic lift strut body resulting in damage to the piston and rod assembly, such as separation of the components from one another.

SUMMARY

In an exemplary embodiment a pneumatic spring strut assembly comprises a cylinder having a wall defining an interior volume comprising a working end and a boosting chamber adjacent to the working end; the working end including a first volume of gas and the boosting chamber including a second volume of gas. A piston assembly is disposed for reciprocation in the working end of the interior volume. A piston rod having a proximal end is secured to the piston and a distal end projects out of a first end of the cylinder. A temperature control valve assembly is disposed in the interior volume separating the working end from the boosting chamber and a shock absorbing assembly is disposed in the interior volume between the piston assembly and the first end of the cylinder, and is compressible by the piston assembly when the temperature control valve is dislodged by pressure in the boosting chamber thereby driving the piston assembly into the shock absorbing member.

In another exemplary embodiment an openable vehicle panel comprises a cylinder having a wall defining an interior volume comprising a working end and a boosting chamber adjacent to the working end; the working end including a first volume of gas and the boosting chamber including a second volume of gas. A piston assembly is disposed for reciprocation in the working end of the interior volume. A piston rod having a proximal end is secured to the piston and a distal end projects out of a first end of the cylinder. A temperature control valve assembly is disposed in the interior volume separating the working end from the boosting chamber and a shock absorbing assembly is disposed in the interior volume between the piston assembly and the first end of the cylinder, and is compressible by the piston assembly when the temperature control valve is dislodged by pressure in the boosting chamber thereby driving the piston assembly into the shock absorbing member.

The above features and advantages, and other features and advantages of the invention, are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which:

FIG. 2 is a sectional, plan view of the pneumatic spring strut of FIG. 1 in another mode of operation;

FIG. 3 is a sectional, plan view of another embodiment of a pneumatic spring strut embodying features of the invention.

DESCRIPTION OF THE EMBODIMENTS

Figure 1:
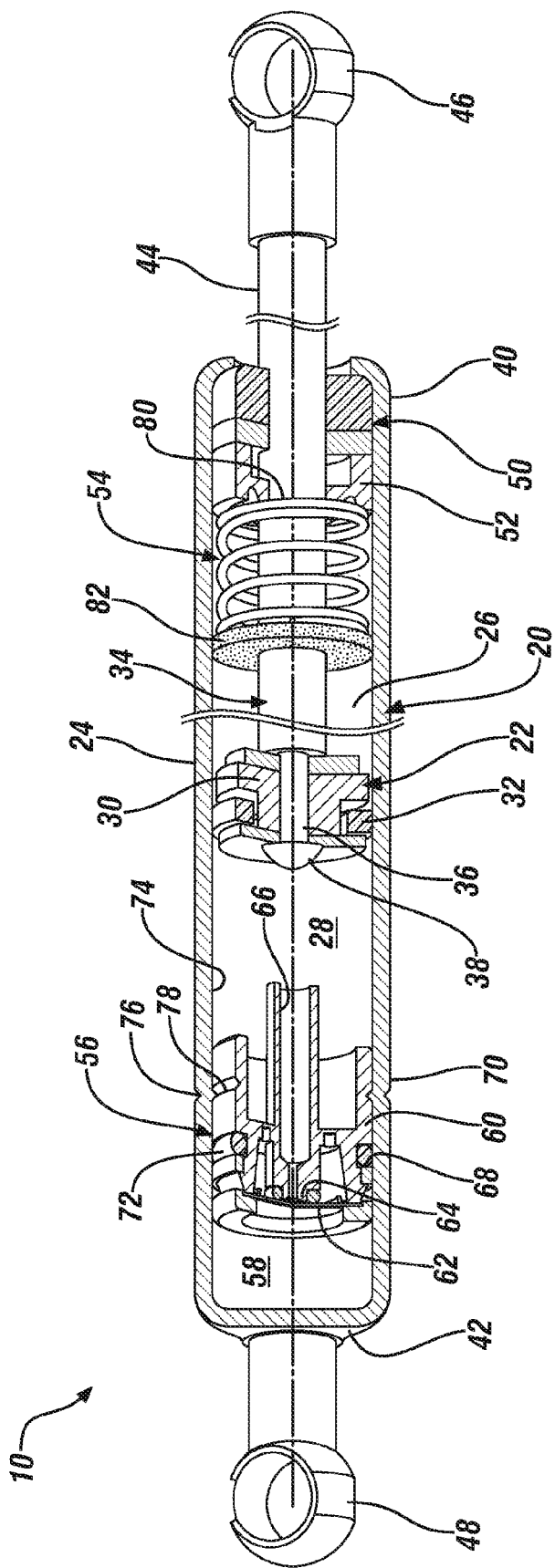
FIG. 1 is a sectional, plan view of a pneumatic spring strut embodying features of the invention.

The following description is merely exemplary in nature and is not intended to limit the present disclosure, its application or uses. It should be understood that throughout the drawings, corresponding reference numerals indicate like or corresponding parts and features. As used herein, the term vehicle is not limited to just an automobile, truck, van or sport utility vehicle, but includes any self-propelled or towed conveyance suitable for transporting a burden. The embodiments shown are applicable to vehicle components, but the system disclosed herein may be used in any suitable applications in which a pneumatic spring strut has application (ex. transportation, energy and aerospace applications, home appliance, home and particularly including many other types of vehicular components and applications).

Figure 4:
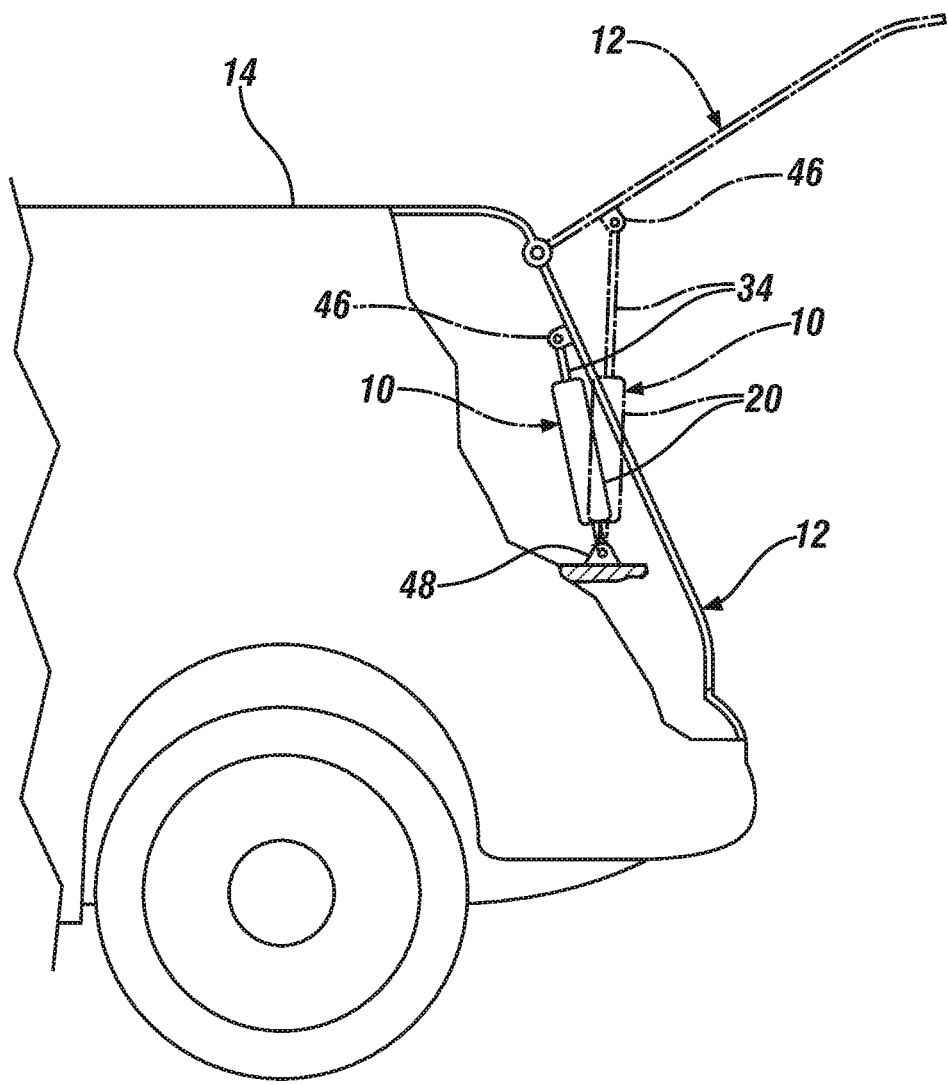
FIG. 4 is a partial schematic view of a vehicle having an openable panel assembly embodying features of the invention.

Referring now to FIGS. 1 and 4, in an exemplary embodiment, a pneumatic spring strut assembly 10, for use in assisting with opening and maintaining open a vehicle panel assembly 12 of a vehicle 14, has a cylinder 20 having a cylinder wall 18 defining an interior volume 25 and whose length is determined by the type of equipment with which the spring strut assembly 10 is to be used. A piston assembly 22 is disposed in the cylinder 20 for reciprocation at a first working end 24. The first working end 24 is separated by the piston assembly 22 into two compartments 26 and 28 which are filled with a first volume of gas (e.g., air, nitrogen or some other inert gas) under pressure. The piston assembly 22 may include a free-fitting piston 30, a piston ring 32 and a piston rod 34 secured at a first, proximal end 36 to the piston 30 by swaging over or riveting the end at 38.

The piston shaft 34 projects out through a first end 40 of cylinder 20; the second end 42 of which is closed. The second, distal end 44 of shaft 34 has a first, connector link 46 rigidly secured thereto and a second, connector link 48 is fixed to the second end 42 of the cylinder 20. Within the cylinder 20 the piston shaft 34 passes through a large seal 50, a guide package 52 and a shock absorbing assembly 54 which are disposed between the first end 40 of the cylinder and the piston assembly 22. The first end 40 of the cylinder 20 is crimped about the seal 50 and internal gas pressure helps to maintain the seal in position.

A temperature control valve "TCV" assembly 56 separates the first. Working end 24 of the cylinder 20 within which the piston assembly 22 reciprocates, from an adjacent boosting chamber 58 containing an additional volume of gas under pressure. The TCV assembly 56 comprises a partition wall bushing unit 60 which is fixed in a predetermined location inside of the cylinder 20 to define the aforementioned boosting chamber 58. The partition wall bushing unit, or bushing valve 60 comprises a valve member such as a bimetallic spring member 62 and valve seat 64. In the open position (not shown), such as when ambient temperatures decrease, the bimetallic spring member 62 bends away from, and disengages from the valve seat 64 providing an opening to the hollow tube portion 66 which leads to compartment 28 of the first end 24 of the cylinder 20.

The TCV assembly 56 is assembled into the cylinder 20. The partition wall bushing unit 60 comprises a seat 68 extending about the circumference of the outer wall 70 in which an O-ring 72 is located. The O-ring forms a seal with the interior 74 of the cylinder 20. The cylinder 20 may have a tube groove 76 formed therein; typically following the insertion of the TCV assembly 56 into the cylinder. The tube groove 76 interfaces with a circumferentially extending retention notch 78 in the outer wall 70 and operate to maintain the TCV assembly 56 in place in the cylinder 20 and to form a seal with the interior 74 thereof. In another embodiment (not shown) the TCV assembly 56 may be press fit into the cylinder 20.

Should the first end 24 of cylinder 20 be evacuated of pressurized gas due to a leakage of seal 50, or other leakage event, the pressure in the boosting chamber 58 may, under some circumstances rise to a level that can overcome the retaining forces imparted on the partition wall bushing unit 60 of the TCV assembly 56 by the tube groove 76. In such an instance the TCV assembly 56 may become dislodged and drive the piston assembly 22 towards the first end 40 of the cylinder 20. In an embodiment, the shock absorbing assembly 54 comprises a compressible member such as helical spring member 80 seated between the piston assembly 22 and the first end 40 of the cylinder 20. An optional bumper 82 may be seated on the helical spring member to define an impact surface for the piston assembly 22. As illustrated in FIG. 2, When the TCV assembly 56 is dislodged by pressure in boosting chamber 58 it may act on the piston assembly 22 and move it in the direction of the first end 40 of the cylinder 20. Upon reaching the first end 40 of the cylinder 20 the piston assembly 22 impacts the shock absorbing assembly 54 causing the spring member 80 to compress. The compression of the spring member 80 of the shock absorbing assembly 54 decelerates the piston assembly 22 and eliminates an abrupt stop that would otherwise occur upon reaching the first end 40 of the cylinder 20 and possible detachment of the piston rod 34 from the piston assembly 22.

In another embodiment illustrated in FIG. 3, the shock absorbing assembly 54 comprises an energy absorbing member 84 such as a compressible bushing member seated between the piston assembly 22 and the first end 40 of the cylinder 20. The energy absorbing member 84 may be constructed of any suitable material such as rubber, polymer foam, metal foam, flexible composite, super folding element, lattice and strut structure, hybrid sandwich composite structure or other suitable energy absorbing material suitable for the particular application, and is compressible by the piston assembly 22 as it reaches the first end 40 of the cylinder 20 and impacts the shock absorbing assembly 54. The compression of the energy absorbing member 84 of the shock absorbing assembly 54 decelerates the piston assembly 22 and eliminates an abrupt stop that would otherwise occur upon reaching the first end 40 of the cylinder 20 and possible detachment of the piston rod 34 from the piston assembly 22 by shearing of the swage or rivet at end 38.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation of material to the teachings of the invention without departing from the essential scope thereof. Therefore, it is intended that the invention not be limited to the particular embodiments disclosed, but that the invention will include all embodiments falling within the scope of the application.

What is claimed is:

1. A pneumatic spring strut assembly comprising:
   a cylinder having a wall defining an interior volume comprising a working end and a boosting chamber adjacent to the working end, the working end including a first volume of gas and the boosting chamber including a second volume of gas;
   a piston assembly disposed for reciprocation in the working end of the interior volume, a piston rod having a proximal end secured to the piston and a distal end projecting out of a first end of the cylinder;
   a temperature control valve assembly disposed in the interior volume separating the working end from the boosting chamber; and
   a shock absorbing assembly, disposed in the interior volume between the piston assembly and the first end of the cylinder, and compressible by the piston assembly when the temperature control valve is dislodged by pressure in the boosting chamber thereby driving the piston assembly into the shock absorbing member.

2. The pneumatic spring strut assembly of claim 1, wherein the shock absorbing assembly further comprises a helical spring member.

3. The pneumatic spring strut assembly of claim 2, wherein the shock absorbing assembly further comprises a bumper seated on the helical spring member to define an impact surface for the piston assembly.

4. The pneumatic spring strut assembly of claim 2, wherein the piston rod is secured at a first end to the piston by one of swaging over or riveting at the end.

5. The pneumatic spring strut assembly of claim 1, wherein the shock absorbing assembly further comprises an energy absorbing member.

6. The pneumatic spring strut assembly of claim 5, wherein the flexible the energy absorbing member comprises one of rubber, polymer foam, metal foam, flexible composite, super folding element, lattice and strut structure, hybrid sandwich composite structure.

7. The pneumatic spring strut assembly of claim 5, wherein the piston rod is secured at a first end to the piston by one of swaging over or riveting at the end.

8. An openable vehicle panel assembly having a pneumatic spring strut assembly comprising:
- a cylinder having a wall defining an interior volume comprising a working end and a boosting chamber adjacent to the working end, the working end including a first volume of gas and the boosting chamber including a second volume of gas;
- a piston assembly disposed for reciprocation in the working end of the interior volume, a piston rod having a proximal end secured to the piston and a distal end projecting out of a first end of the cylinder;
- a temperature control valve assembly disposed in the interior volume separating the working end from the boosting chamber; and
- a shock absorbing assembly, disposed in the interior volume between the piston assembly and the first end of the cylinder, and compressible by the piston assembly when the temperature control valve is dislodged by pressure in the boosting chamber thereby driving the piston assembly into the shock absorbing member.

9. The openable vehicle panel assembly of claim 8, wherein the shock absorbing assembly further comprises a helical spring member.

10. The openable vehicle panel assembly of claim 9, wherein the shock absorbing assembly further comprises a bumper seated on the helical spring member to define an impact surface for the piston assembly.

11. The openable vehicle panel assembly of claim 9, wherein the piston rod is secured at a first end to the piston by one of swaging over or riveting at the end.

12. The openable vehicle panel assembly of claim 8, wherein the shock absorbing assembly further comprises an energy absorbing member.

13. The openable vehicle panel assembly of claim 12, wherein the flexible the energy absorbing member comprises one of rubber, polymer foam, metal foam, flexible composite, super folding element, lattice and strut structure, hybrid sandwich composite structure.

14. The openable vehicle panel assembly of claim 12, wherein the piston rod is secured at a first end to the piston by one of swaging over or riveting at the end.

15. The openable vehicle panel assembly of claim 12, wherein the energy absorbing member comprises a compressible bushing member.

* * * * *